(12) United States Patent
Klima, Jr. et al.

(10) Patent No.: US 6,319,453 B1
(45) Date of Patent: *Nov. 20, 2001

(54) METHOD OF MAKING A MULTIPLE NECK SPRAY BOTTLE

(75) Inventors: Walter F. Klima, Jr., Travelers Rest, SC (US); William L. Klima, Stafford, VA (US)

(73) Assignee: Sprayex, Inc., Travelers Rest, SC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/808,575

(22) Filed: Feb. 28, 1997

Related U.S. Application Data

(63) Continuation-in-part of application No. 08/694,386, filed on Aug. 8, 1996, now abandoned, which is a continuation of application No. 08/507,691, filed on Jul. 25, 1995, now abandoned, which is a continuation-in-part of application No. 08/485,254, filed on Jun. 7, 1995, now Pat. No. 5,890,624, which is a continuation-in-part of application No. 08/279,978, filed on Jul. 25, 1994, now Pat. No. 5,529,216.

(51) Int. Cl.[7] .................................................. B29C 49/02
(52) U.S. Cl. ........................ 264/504; 264/523; 264/537; 264/540
(58) Field of Search .................................... 264/504, 526, 264/536, 540, 537; 215/40, 380; 220/661, 676; 222/383.1, 478, 482; 425/525, 532

(56) References Cited

U.S. PATENT DOCUMENTS

| 3,024,947 | 3/1962 | Jeynes, Jr. ................................ 222/80 |
| 3,080,094 | 4/1958 | Modderno ................................ 222/82 |
| 3,120,679 | * 2/1964 | Price et al. ............................ 264/540 |
| 3,134,505 | 5/1964 | Modderno ................................ 222/82 |
| 3,347,410 | 8/1966 | Schwartzman ........................... 222/80 |
| 3,534,435 | * 10/1970 | John ....................................... 264/540 |
| 3,655,096 | 4/1972 | Easter ..................................... 222/82 |
| 3,870,147 | 3/1975 | Orth ....................................... 206/222 |
| 3,966,089 | 6/1976 | Klingaman .............................. 222/88 |
| 4,177,938 | 12/1979 | Brina ...................................... 222/80 |
| 4,217,328 | 8/1980 | Cambio, Jr. ........................... 264/504 |
| 4,265,372 | 5/1981 | Wainberg ............................... 222/82 |
| 4,355,739 | 10/1982 | Vierkotter ............................. 222/134 |
| 4,419,323 | * 12/1983 | Winchell ............................... 264/523 |
| 4,518,558 | * 5/1985 | Anway et al. ......................... 264/531 |
| 4,618,076 | * 10/1986 | Silvenis ................................ 222/383.1 |
| 4,679,706 | 7/1987 | Magid et al. .......................... 222/130 |
| 4,705,191 | 11/1987 | Itzel et al. .............................. 222/80 |
| 4,746,283 | * 5/1988 | Hobson ................................. 264/540 |
| 4,793,475 | 12/1988 | Itzel ...................................... 206/221 |
| 4,832,230 | 5/1989 | Janowitz ................................ 222/80 |
| 4,893,730 | 1/1990 | Bolduc .................................. 222/80 |

(List continued on next page.)

FOREIGN PATENT DOCUMENTS

| 1939086 | 2/1971 | (DE) . |
| 0606672 A1 | 7/1994 | (EP) . |
| 50-25513 | 8/1975 | (JP) . |
| 61-171321 | 8/1986 | (JP) . |
| 62-51426 | 3/1987 | (JP) . |
| 59-067019 | * 4/1984 | (JP) ........................................ 264/523 |

*Primary Examiner*—Jan H. Silbaugh
*Assistant Examiner*—Suzanne E. McDowell
(74) *Attorney, Agent, or Firm*—William L. Klima

(57) ABSTRACT

A method of making a multiple neck spray bottle comprising the steps of providing a blow mold having a molding cavity configured for molding a multiple-neck spray bottle have multiple open headed neck portions with at least one threaded neck portion configured to connect with the spray head, providing at least one plastic parison inside the molding cavity, blow molding the at least one parison inside the molding cavity to form the multiple neck spray bottle, and opening the blow mold to release the formed multiple neck spray bottle from the blow mold.

11 Claims, 5 Drawing Sheets

U.S. PATENT DOCUMENTS

| | | |
|---|---|---|
| 4,925,066 | 5/1990 | Rosenbaum . |
| 4,979,638 | 12/1990 | Bolduc ................................. 222/1 |
| 5,012,978 | 5/1991 | Bolduc ............................. 239/304 |
| 5,052,585 | 10/1991 | Bolduc ................................. 222/1 |
| 5,056,685 | 10/1991 | Wild ................................... 222/82 |
| 5,135,702 | 8/1992 | Eales ................................ 264/516 |
| 5,337,921 | 8/1994 | Wilson et al. ..................... 222/105 |
| 5,375,769 * | 12/1994 | Schultz ............................. 239/310 |
| 5,398,846 | 3/1995 | Corba et al. ......................... 222/1 |
| 5,421,483 | 6/1995 | Parise ................................. 222/82 |
| 5,439,141 | 8/1995 | Clark et al. ....................... 222/136 |
| 5,529,216 | 6/1996 | Klima et al. ...................... 222/130 |

\* cited by examiner

METHOD OF MAKING A MULTIPLE NECK SPRAY BOTTLE

RELATED APPLICATIONS

This is a continuation-in-part of U.S. patent application entitled "Rechargeble Dispensers, Ser. No. 08/694,386, filed Aug. 8, 1996, now abandoned, which is a continuation of U.S. patent application entitled "Rechargeable Dispensers, Ser. No. 08/507,691, filed Jul. 25, 1995, now abandoned, which is a continuation in part of U.S. patent application entitled "Rechargeable Dispensers, Ser. No. 08/485,254, filed Jun. 7, 1995, now U.S. Pat. No. 5,890,624, which is a continuation in part of U.S patent application entitled "Rechargeable Dispensers", Ser. No. 08/279,978, filed Jul. 25, 1994 now U.S. Pat. No. 5,529,216. These references are all fully incorporated herein by reference.

FIELD OF THE INVENTION

This invention relates to a multiple neck spray bottle and multiple neck spray bottle dispenser. Further, this invention relates to a method of making and a method of using a multiple neck spray bottle dispenser.

BACKGROUND OF THE INVENTION

Currently, spray bottles with liquid chemical contents are sold in high volumes to both the consumers and professional markets in the United States and throughout the world. Typical chemical contents include glass cleaners, bathroom cleaners, surface cleaners, disinfectants, degreasers, waxes, sealants and a variety of other types and classes of chemicals, which are bottled in spray bottles prior to shipment to a point of delivery or sale.

A conventional spray bottle package is constructed of two (2) separate basic components, including 1) a spray head provided with a down tube; and 2) a one (1) neck spray bottle. The conventional spray head is provided with an inner threaded coupler, which threadedly connects with an outer threaded neck portion of the conventional spray bottle.

The conventional spray bottle is provided with a single neck portion through which liquid chemical contents are added to the conventional spray bottle during a filling operation. After the filling operation, the down tube of the conventional spray bottle is insert through the neck opening in the conventional spray bottle, and then the inner threaded coupler of the conventional spray head is rotated (e.g. right hand thread) to the outer threaded neck portion of the conventional spray bottle to securely connect and seal the conventional spray head to the spray bottle. In high speed production, the steps of filling, inserting the downtube, rotating and tightening the threaded coupler of the conventional spray head to the threaded neck portion of the conventional spray bottle are accomplished by high speed machine automation.

The conventional spray bottle package for consumer use is a one time use package, which is typically thrown away by the consumer after the liquid chemical contents are consumed. The conventional spray bottle for commercial use typically includes a heavier duty spray head and a heavier duty spray bottle (e.g. thicker wall), and are refilled numerous time prior to disposal. Both the conventional consumer and commercial grade spray bottles packages can only be filled or refilled with the spray head disconnected from the spray bottle.

In the United States, generally the spray head components are manufactured by a very limited number of large injection molding manufacturers such as Calmar, Continental, AFA and Owens-Brockway while spray bottles are manufactured by a wide variety of blow molding manufactures producing custom spray bottle designs for bottlers or molded by large bottlers themselves.

SUMMARY OF THE INVENTION

A first object of the present invention is to provide an improved multiple neck spray bottle.

A second object of the present invention is to provide a spray bottle having at least two (2) neck portions located in substantially close proximity to each other.

A third object of the present invention is to provide a spray bottle having at least two (2) neck portions located substantially within a center portion of the width of the spray bottle.

A fourth object of the present invention is to provide a spray bottle having at least two (2) neck portions located substantially within a center portion of the width of the spray bottle, the spray bottle including a first neck portion oriented substantially parallel relative to a longitudinal axis of the spray bottle, and including a second neck portion oriented perpendicularly or upwardly at an angle substantially in the range of 0° to 90° relative to a longitudinal axis of the spray bottle.

A fifth object of the present invention is to provide a spray bottle having at least two (2) neck portions located substantially within a center portion of the width of the spray bottle, the spray bottle including a first neck portion oriented substantially parallel relative to a vertical axis of the spray bottle, and including a second neck portion oriented perpendicularly or upwardly preferably at an angle substantially in the range of 0° to 70° relative to a longitudinal axis of the spray bottle.

A sixth object of the present invention is to provide a spray bottle having at least two (2) neck portions located substantially within a center portion of the width of the spray bottle, the spray bottle including a first neck portion oriented substantially parallel relative to a vertical axis of the spray bottle, and including a second neck portion oriented more preferably at an angle substantially in the range of 20° to 60° relative to a vertical axis of the spray bottle.

A seventh object of the present invention is to provide a spray bottle having at least two (2) neck portions located substantially within a center portion of the width of the spray bottle, the spray bottle including a first neck portion oriented substantially parallel relative to a longitudinal axis of the spray bottle, and including a second neck portion oriented upwardly even more preferably at an angle substantially in the range of 40° to 50° relative to a longitudinal axis of the spray bottle.

An eighth object of the present invention is to provide a spray bottle having at least two (2) neck portions located substantially within a center portion of the width of the spray bottle, the spray bottle including a first neck portion oriented substantially parallel relative to a longitudinal axis of the spray bottle, and including a second neck portion oriented upwardly most preferably at an angle of substantially 45° relative to a longitudinal axis of the spray bottle.

A ninth object of the present invention is to provide a spray bottle having at least two (2) neck portions located substantially within a center portion of the width of the spray bottle, the spray bottle including a first neck portion and a second neck portion provided in an upper portion of the spray bottle.

A tenth object of the present invention is to provide a spray bottle having at least two (2) neck portions located substantially within a center portion of the width of the spray bottle, the spray bottle including a first neck portion and a second neck portion provided in an upper portion of the spray bottle and located at or above a center height of the spray bottle.

A eleventh object of the present invention is to provide a spray bottle having at least two (2) neck portions located at different heights of the spray bottle.

A twelfth object of the present invention is to provide a method of making a spray bottle having at least two (2) neck portions.

A thirteenth object of the present invention is to provide a method of blow molding a spray bottle having at least two (2) neck portions.

A fourteenth object of the present invention is to provide a method of blow molding a spray bottle having at least two (2) neck portions with a one (1) pin blow molding apparatus.

A fifteenth object of the present invention is to provide a method of blow molding a spray bottle having at least two (2) neck portions with a two (2) pin blow molding apparatus.

A sixteenth object of the present invention is to provide a method of blow molding a spray bottle having multiple neck portions with a multiple pin blow molding apparatus.

The present invention is directed to a spray bottle provided with multiple necks. A preferred embodiment is a two (2) neck spray bottle with one neck oriented for accommodating a spray head and another neck oriented for filling or refilling the spray bottle.

The following is a list of parameters preferably incorporated in the spray bottle according to the present invention.
1) number of neck portions, preferably two (2) for most applications;
2) locating multiple neck portions substantially within a center portion of the width of the spray bottle;
3) locating neck portions at different heights of the spray bottle;
4) orienting a first neck portion substantially parallel to the vertical axis of the spray bottle and orienting a second neck portion perpendicularly or upwardly at an angle substantially in the range of 0° to 90° relative to a vertical axis of the spray bottle;
5) orienting a first neck portion substantially parallel to the vertical axis of the spray bottle and orienting a second neck portion perpendicularly or upwardly at an angle substantially in the range of 0° to 70° relative to a vertical axis of the spray bottle.
6) orienting a first neck portion substantially parallel to the vertical axis of the spray bottle and orienting a second neck portion upwardly preferably at an angle substantially in the range of 20° to 60° relative to the vertical axis of the spray bottle.
7) orienting a first neck portion substantially parallel to the vertical axis of the spray bottle and orienting a second neck portion upwardly more preferably at an angle substantially in the range of 40° to 50° relative to the vertical axis of the spray bottle.
8) orienting a first neck portion substantially parallel to the vertical axis of the spray bottle and orienting a second neck portion upwardly most preferably at an angle of substantially 45° relative to the longitudinal axis of the spray bottle.
9) locating the multiple neck portions in an upper portion of the spray bottle;
10) locating the multiple neck portions in an upper portion of the spray bottle and at or above a center height of the spray bottle.

The neck portions of the spray bottle according to the present invention can be configured or arranged for connecting to other components. For example, the first neck portion for accommodating a spray head is preferably provided with an outer thread portion designed to connect and fluidly seal with the inner threaded coupler and seal of a conventional spray bottle. The thread design including orientation (e.g. right hand), number of threads, length of thread portion, inner diameter and outer diameter of the threads, advance length, cross-sectional shape of threads themselves (e.g. substantially flat upper edges to enhance gripping action), locking designs, etc. need to be taken into consideration for a particular design and application.

The second neck portion is preferably configured to accommodate a resealable closure. For example, the second neck is preferably provided with an outer threaded portion for connecting and sealing with a cap having inner threads. Alternatively, the second neck can be configured or designed to accommodate a wide variety of other different types of resealable closures functioning to allow the second neck portion to be opened for filling or refilling the spray bottle, and then closed for securely sealing the second neck to prevent spillage or leakage of liquid from the spray bottle out the second neck portion.

The first neck portion and second neck portion are preferably located substantially in a center portion of the width of the spray bottle. The locations of the first and second neck portions are particularly important with respect to the method of making the spray bottle. Specifically, in the method of making the spray bottle according to the present invention using a one (1) pin blow molding apparatus, it is highly desirable to locate both necks substantially within the center portion of the width of the spray bottle to increase the wall thickness of the neck portions to mechanically strengthen the neck portions (i.e. outer threaded portions need to be mechanically stiff enough to prevent distortion of the sealing surfaces of neck portions during connecting the spray head and cap to the spray bottle). More specifically, the parison used for blow molding the spray bottle has a predetermined width, and is less than the width of the spray bottle (i.e. less than width of mold cavity). The parison substantially defines the center portion of the width of the molded spray bottle. It is highly desirable to locate the neck portions substantially within the width of the parison to enhance the wall thickness of the neck portions. Thus, the plastic material at the parison during molding does not need to be substantially dislocated or stretched by inner air pressure widthwise, if the neck portions are located substantially within the width of the parison (i.e. the less material that needs to be moved laterally outwardly in the width and thickness directions, in particular the greater width direction, the greater the wall thickness can be had for the neck portions located substantially within the center width portion of the spray bottle).

The neck portions are preferably located at different heights, again to provide enough plastic material at the parison to make neck portions with sufficient wall thickness and strength.

The first neck portion is preferably oriented substantially parallel to the vertical axis of the spray bottle (i.e. vertical axis when spray bottle is resting on a horizontal surface), since the first neck portion is connected preferably connected to a spray head.

The second neck portion is preferably oriented to facilitate filling or refilling the spray bottle with liquid through the second neck portion. A second neck portion oriented substantially parallel (i.e. vertical) to the first neck portion is good for filling purposes, especially filling by machine automation. A second neck portion preferably oriented substantially at a 45° angle relative to the first neck portion, allows for spray bottle designs that allow for better access to and less interference with the spray head when closing or opening the resealable cap and filling and refilling through the second neck portion. As a further example, the spray bottle may be filled with water under a tap. The preferred 45° degree orientation of the second neck greatly facilitates tilting the spray bottle at an approximately 45° degree angle then orienting the second neck portion substantially vertically under the tap while the spray head is out of the way from the tap and not interfering therewith during filling.

Thus, an angle in the range of 0° to 90°, preferably a range of 20° to 70°, more preferably a range of 40° to 70°, and most preferably an angle of substantially 45° for the orientation of the second neck portion relative to the first neck portion provides significant benefits.

In regard to the one (1) blow pin method of making the spray bottle according to the present invention, it is more difficult to make a second neck portion having a vertically orientation than a perpendicular orientation relative to the vertical axis of the spray bottle. Specifically, as the parison is inflated and expands inside the blow mold cavity, the wall of the parison is moving outwardly in substantially all directions. It is more difficult to blow a portion of the wall of the parison to become the second neck portion first outwardly and then upwardly in the case of the vertically oriented version of the second neck portion. In contrast, a horizontally oriented second neck portion would be the easiest configuration to accommodate the expanding wall portion of the Parison to become the second neck portion. Thus, the preferred 45° degree orientation is a good compromise for this particular parameter of blowing molding the second neck portion with one (1) pin blow molding apparatus.

Method of Making

The present invention is also directed to a method of making the spray bottle according to the present invention with a one (1) pin blow molding apparatus. This method is particularly advantageous with respect to the practical considerations of cost and standard available blow molding equipment in the United States. Specifically, this method of making allows the use of state-of-the-art blow molding equipment currently being utilized for making high volumes of single neck spray bottles.

In this method, the mold is made with a single opening in the upper portion of the mold for accommodating the single blow pin. Thus, a single parison is used during the blow molding operation. During molding, the two (2) halves of the mold are closed on the parison that has been vertically extruded downwardly in the shape of a cylinder. The single blow pin then begins to blow pressurized air inside the center of the parison to expand the parison, similar to a balloon expanding, inside the confines of the mold. The mold is cooled by a circulating water circuit inside the outer walls of the mold to harden the walls of the parison when it expands into the walls of the mold.

The single blow pin expands the parison outwardly forming the first neck portion in the upper portion of the mold while the expanding parison expands and enters into a portion of the mold defining the second neck portion. When the molded spray bottle is removed from the mold, the first neck portion is finished with an opening extending into the interior of the bottle while the second neck portion is unfinished (i.e. completely closed due to being molded as a wall portion of the spray bottle blocking access into the interior of the spray bottle). Thus, a separate finishing operation (e.g. boring, reaming, punching) is required to open up the end of the second neck portion to finish the second neck portion to provide an opening into the interior of the spray bottle. Further, the outer flash is trimmed from the molded spray bottle to finish the spray bottle.

In another method of making the spray bottle according to the present invention, two separate blow pins are provided in the blow molding apparatus. This method, allows for the two neck portions of the spray bottle to be blown and finished upon exiting the mold. Thus, two separate parisons will be utilized in this blow molding operation.

With the use of two parisons, an insert or other tool will need to be implemented inside the closed mold halves to prevent the formation of an inner wall resulting in two separate chambers (i.e., tool to comprise inner wall). For example, a separating plate suspended by the blow pins to be surrounded by the mold halves could be implemented.

DETAILED DESCRIPTION OF PREFERRED EMBODIMENTS

Figure 2:
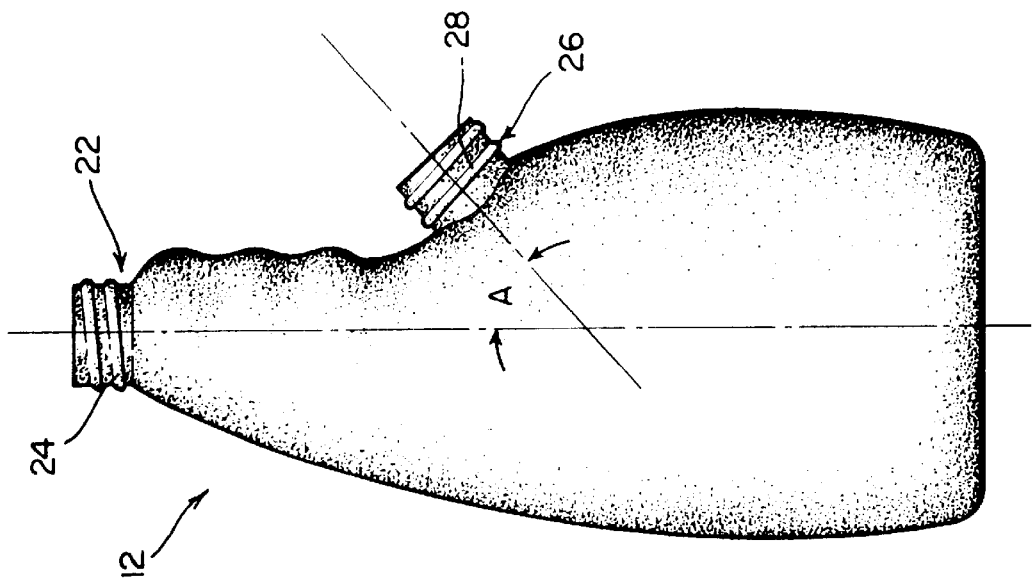
FIG. 2 is a side elevational view of a multiple neck spray bottle according to the present invention with the spray head and cap removed.

The plastic spray bottle according to the present invention is provided with multiple (i.e. at least two) neck portions. The spray bottle can be made from a wide variety of virgin and composite plastic material and/or layer, including made from polyethylene, polypropylene, polyvinyl chloride (PVC), polyethylene terephalate (PET), and other suitable plastic materials, particularly those commonly used in blow molding containers.

The spray bottle according to the present invention includes a body portion and at least two (2) neck portions extending from the body portion. The neck portions can extend at any height and/or direction or angle from the body portion, however, it is preferred if the neck portions extend from an upper portion of the body portion to facilitate manufacturing, and for ornamental and other design considerations.

The neck portions can have various designs, however, it is preferred that the neck portions are each provided with an opening to an inner to allow ingress and egress of fluid, in particular liquid. However, sealed neck portions can be provided for accommodating separate internally installed reservoirs or chambers for containing, for example, chemical concentrate, reactive chemicals, chemicals modifiers.

Most preferably, each neck portion is provided with an outer threaded portion to allow mechanical connection with various other components, including spray heads, resealable closures (e.g. caps), non-resealable closures (e.g. breakable seals), spouts, and other separate devices to provide various liquid dispensing handling aspects.

Further, it is preferable that each neck portion opening is located in an upper portion of the body portion of the spray bottle. Specifically, it is preferable that each neck portion opening is located above a highest liquid level mark of the spray bottle. Thus, when the spray bottle is completely filled with a liquid, the liquid level is below each neck portion opening to prevent leakage of liquid out the neck portions. However, adequate sealing can be provided with a foam cap seal to allow the second neck portion to be located below the highest liquid level mark.

In the particular use of the spray bottle according to the present invention as a spray bottle dispenser (i.e. used in combination with a spray head), it is desirable that one neck portion is oriented substantially vertically (i.e. when spray bottle is resting or horizontal surface) for accommodating the spray head. The remaining one or more neck portions can be also oriented vertically, or at an angle relative to a vertical axis of the spray bottle.

Based on the one-pin method of making the spray bottle according to the present invention, as discussed in detail below, the spray bottle according to the present invention has a preferred structural configuration. Specifically, the following is a list of parameters preferably incorporated in the spray bottle according to the present invention.

1) number of neck portions, preferably two (2) for most applications;
2) locating multiple neck portions substantially within a center portion of the width of the spray bottle;
3) locating neck portions at different heights of the spray bottle;
4) orienting a first neck portion substantially vertically and orienting a second neck portion at an angle substantially in the range of 0° to 90° relative to a longitudinal axis of the spray bottle;
5) orienting a first neck portion substantially parallel to the longitudinal axis of the spray bottle and orienting a second neck portion at an angle substantially in the range of 0° to 70° relative to a longitudinal axis of the spray bottle;
6) orienting a first neck portion substantially parallel to the longitudinal axis of the spray bottle and orienting a second neck portion preferably at an angle substantially in the range of 20° to 60° relative to the longitudinal axis of the spray bottle;
7) orienting a first neck portion substantially parallel to the longitudinal axis of the spray bottle and orienting a second neck portion more preferably at an angle substantially in the range of 40° to 50° relative to the longitudinal axis of the spray bottle;
8) orienting a first neck portion substantially parallel to the longitudinal axis of the spray bottle and orienting a second neck portion most preferably at an angle of substantially 45° relative to the longitudinal axis of the spray bottle;
9) locating the multiple neck portions in an upper portion of the spray bottle; and
10) locating the multiple neck portions in an upper portion of the spray.

Figure 1:
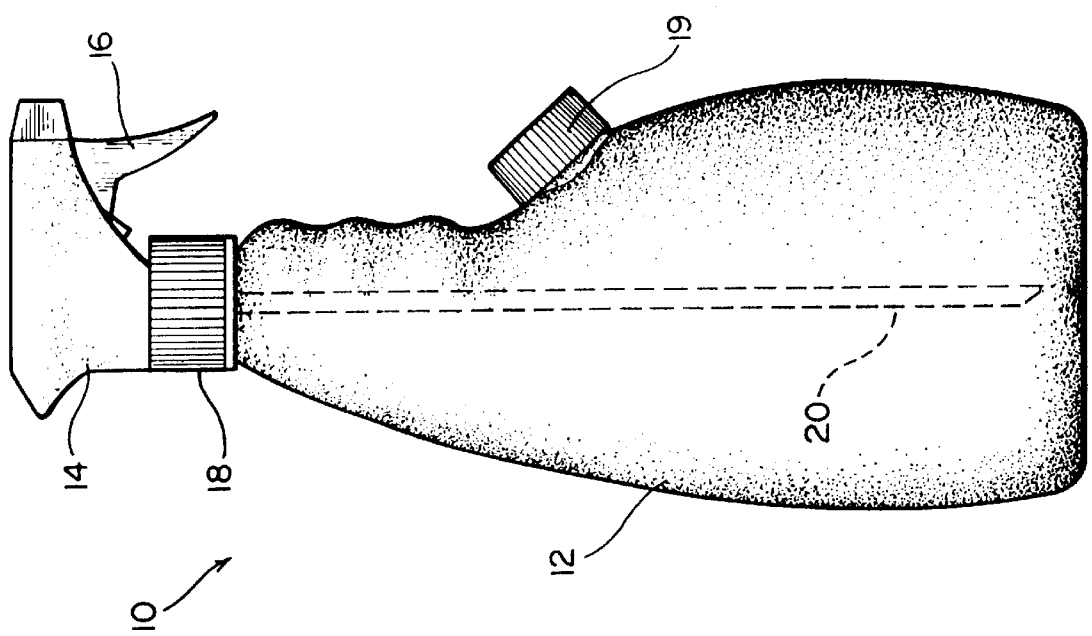
FIG. 1 is a side elevational view of a multiple neck spray bottle apparatus according to the present invention.

A preferred spray bottle dispenser 10 comprising a preferred spray bottle 12, spray head 14, and closure cap 16 is shown in FIG. 1. The spray bottle 12 by itself is shown in FIG. 2.

The spray head 12 is a trigger pump-type variety (e.g. Calmar) provided with a finger actuated trigger 16, an inner threaded connector 18 for mechanically coupling the spray head 12 to the spray bottle 12, and a down tube 20 extending downwardly inside the spray bottle 12.

The spray head 12 is provided with an internal spring biased piston/cylinder arrangement for applying a suction force on fluid in the down tube 20 to withdraw liquid from the spray bottle 12 into the cylinder inside the spray head 12. A one-way check valve in the spray head only allows fluid to enter through the down tube 20 into the cylinder in the spray head, but does not allow it to exit out of the cylinder back down into the down tube 20.

The spray bottle 12 shown in FIG. 2 is provided with a first neck portion 22 having external threads 24 and a second neck portion 26 having external threads 28. The first neck portion 22 is oriented vertically (i.e., when the spray bottle 12 is resting on a horizontal support surface), and threadedly engages with the spray head 14, as shown in FIG. 1.

Figure 3:
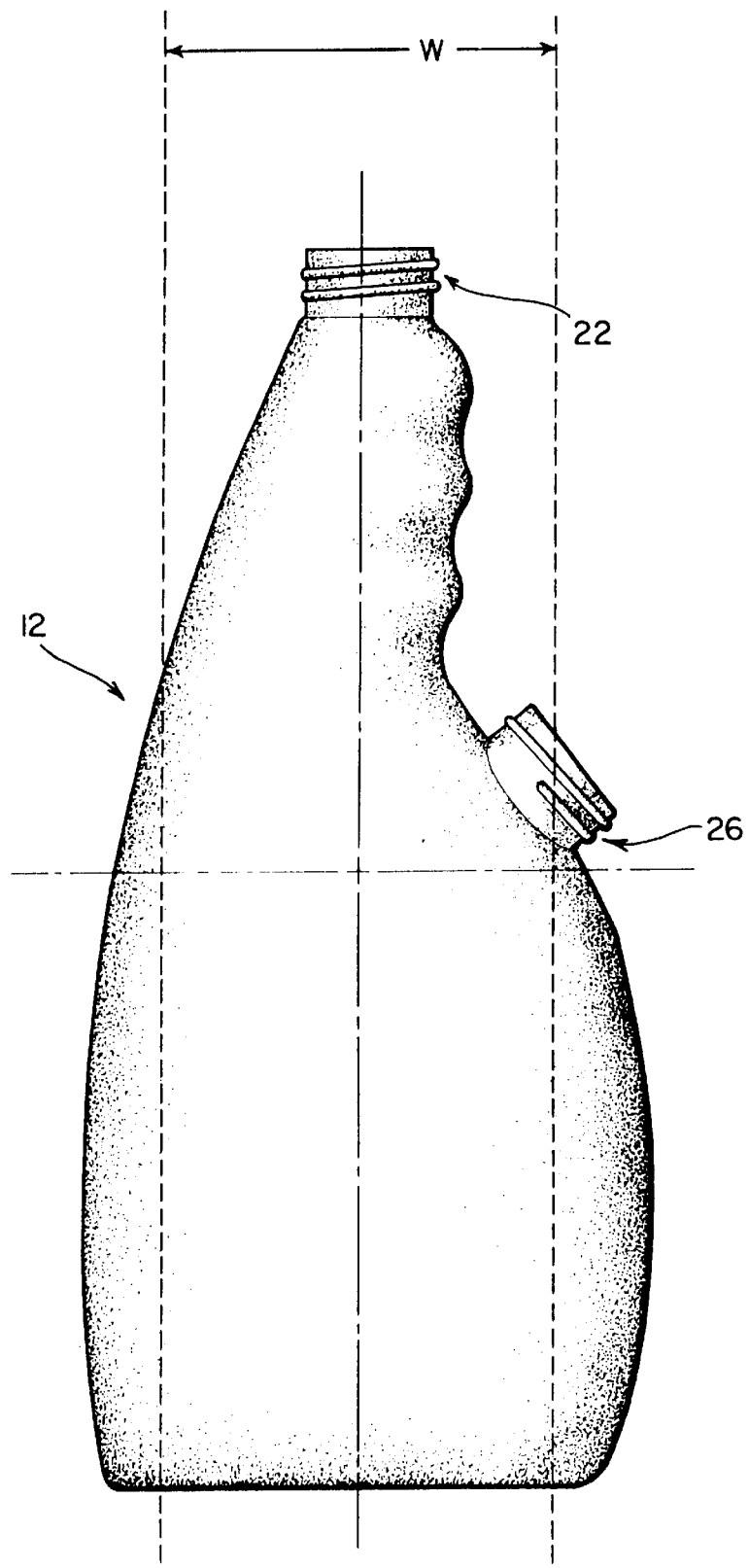
FIG. 3 is a detailed side elevational view of a multiple neck spray bottle according to the present invention.
Figure 4A:
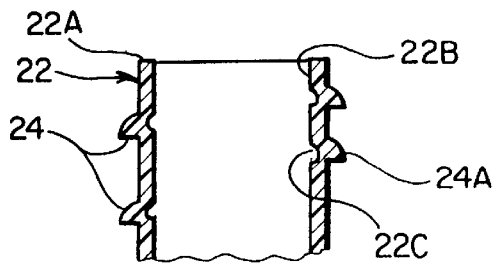
FIG. 4A is a partial vertical cross-section of a first neck portion of the spray bottle according to the present invention.
Figure 4B:
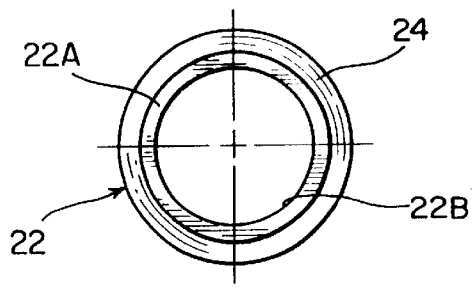
FIG. 4B is a top elevational view of the first neck portion shown in FIG. 4A.
Figure 5A:
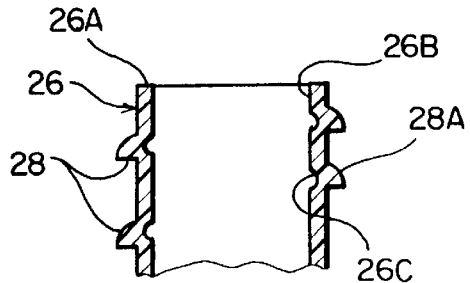
FIG. 5A is a cross-sectional view of a second neck portion of a spray bottle according to the present invention.
Figure 5B:
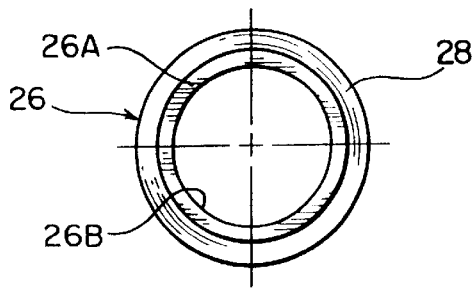
FIG. 5B is a top planar view of the second neck portion shown in FIG. 5A.

The second neck portion 26 is oriented at an angle A relative the vertical axis of the spray bottle 12. Again, the second neck portion 26 is preferably oriented at an angle A substantially in the range of 0° to 90° relative to the vertical axis of the spray bottle. Further, the second neck portion 26 is more preferably oriented at an angle A substantially in the range of 0° to 70° relative to the vertical longitudinal axis of the spray bottle. Even further, the second neck portion 26 is even more preferably oriented substantially in the range of 20° to 60° relative to the vertical longitudinal axis of the spray bottle. Better yet, the second neck portion 26 is even more preferably oriented at an angle A substantially in the range of 40° to 50° relative to the vertical axis of the spray bottle. Best yet, the second neck portion 26 is most preferably oriented at an angle of substantially 45° relative to the vertical longitudinal axis of the spray bottle;

The spray bottle 12 shown in FIG. 3 is blow molded from a parison having a width W. The first neck portion 22 is substantially centered in the width W of the parison while the second neck portion 26 is partially (i.e. approximately one-half (½) width of second neck portion 22) located within in the width W of the parison. In order to ensure a sufficient amount of plastic material will form the second neck portion 26, preferably the second neck portion 26 is located substantially within the width W of the parison, and more preferably entirely within in the width W of the parison.

An upper portion of the first neck portion 22 is cylindrical-shaped, and provided with external threads 24 molded so as to extend outwardly from the surface thereof. The external threads 24 (e.g., helical-shaped arrangement) are preferably molded so as to have a flattened lower surface to enhance gripping between the spray bottle 12 and internal threaded coupler 18 of the spray head 14. The first neck portion 22 is provided with a circular flat end face 22A defining a circular opening 22B into the first neck portion 22. The circular flat end face 22A provides a sealing surface cooperating with a circular flat sealing surface of the internal threaded coupler 18 of the spray head 14. The molding of the external threads 24 results in a slight helical-shaped indentation 22C in the inner surface of the first neck portion 22.

An upper portion of the second neck portion 26 is cylindrical-shaped, and provided with external threads 28 molded so as to extend outwardly from the surface thereof. The external threads 28 (e.g., helical-shaped arrangement) are preferably molded so as to have a flattened lower surface to enhance gripping between the spray bottle 12 and inner threads of the cap 19. The second neck portion 26 is provided with a circular flat end face 26A defining a circular opening 26B into the second neck portion 26. The circular flat end face 26A provides a sealing surface with a circular flat inner sealing surface of the cap 19. The molding of the external threads 28 results in a slight helical-shaped indentation 26C in the inner surface of the second neck portion 26.

In more preferred embodiments, the second neck portion 26 is configured to provide additional structural stiffness or rigidity to ensure adequate sealing with the cap 19. Specifically, the upper external threaded portion of the second neck portion 26 must have sufficient structurally stiffness and integrity to prevent crushing, bending, folding or localized and overall deformation of the upper sealing surface (i.e. circular flat end face 26A) and edge around opening 26B when the cap 19 is threaded and tightened onto the second neck portion 26.

In the single-pin blow molding method of making the spray bottle 12 described in detail below, the first neck portion is formed opened by the single pin extending through the first neck portion 22 during blow molding, however, the second neck portion is blow molded closed as a portion of the wall of the spray bottle 12. This results in the second neck 26 portion having a thinner wall thickness, and being less rigid relative to the first neck portion 22. Thus, it is desirable to configure the second neck portion 26 so as to be more rigid by various techniques to be described below.

Figure 6A:
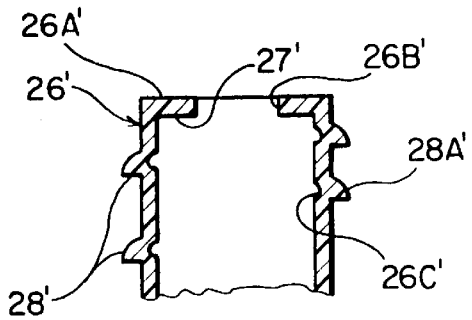
FIG. 6A is a cross-sectional view of another embodiment of a second neck portion of the spray bottle according to the present invention showing an inwardly extending radial flange.
Figure 6B:
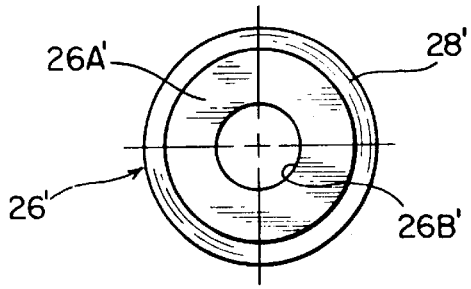
FIG. 6B is a top planar view of the second neck portion shown in FIG. 6A.

As shown in FIGS. 6A and 6B, the second neck portion 26' is stiffened by providing an inwardly extending radial flange 27' having a more pronounced circular flat end face 26'. This arrangemnent provides an increase in the area of circular flat end face 26', and thus an increase in the sealing area. Further, this stiffens the circular opening 26B' to prevent the upper edge of the circular opening 26B' against deforming inwardly and then bending or folding over.

Figure 7A:
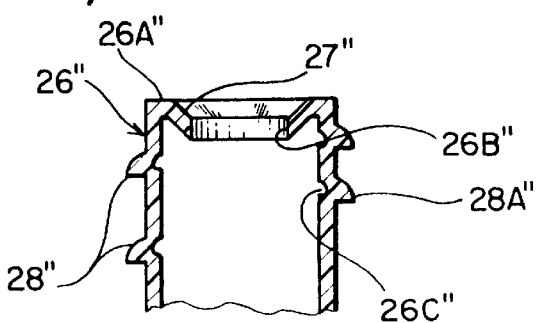
FIG. 7A is a cross-sectional view of a further embodiment of the second neck portion of a spray bottle according to the present invention.
Figure 7B:
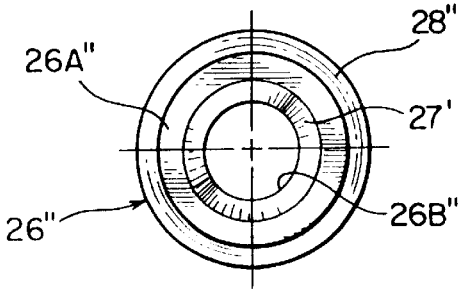
FIG. 7B is a top planar view of the second neck portion shown in FIG. 7A.

As shown in FIGS. 7A and 7B, the second neck portion 26" is provided with an inwardly extending inclined radial flange 27". This arrangement again stiffens the second neck portion 26" against inward deformation.

These and other configurations and designs can be made to minimize deformation of the second neck portion 26", especially when tightening the cap 19 onto the second neck portion 26.

Figure 8:
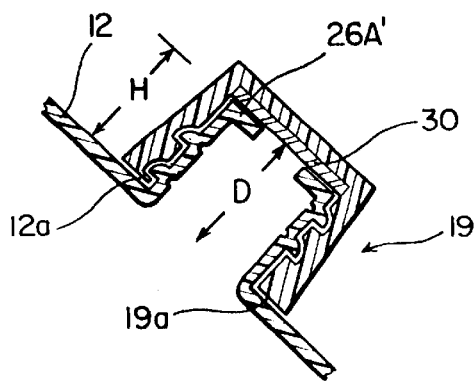
FIG. 8 is a partial broken away vertical cross-sectional view of the second neck portion and cap showing the stop arrangement between the cap and wall portion of the bottle.

In order to prevent over tightening of the cap 19 and potentially deforming the second neck portion 26 and create a leaking seal problem, the cap 19 is preferably configured in the manner shown in FIG. 8. Specifically, the height H is sized to be substantially equal to the depth D so that the lower edge of the cap 19a engages with a wall portion 12a of the spray bottle 12. Thus, the wall portion 12a functions as a stop to prevent overtightening of the cap 19. Further, a seal 30 is preferably provided to ensure a good liquid tight seal between the cap 19 and the inwardly extending radial flange 26A'. The seal 30 can be made of paper, cloth, foam foil, composites of these materials and other suitable sealing configurations.

Figure 9:
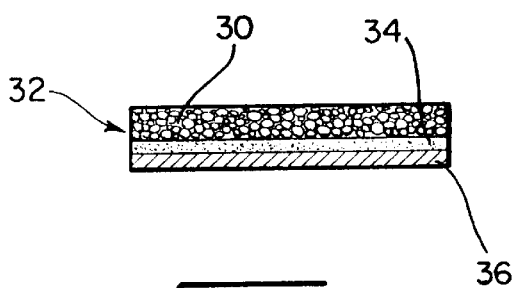
FIG. 9 is a detailed cross-sectional view of a cap liner.

The seal 30 is preferably provided by a cap liner 32 shown in FIG. 9. The cap liner 32 comprises the seal 30 (e.g., foam) release layer 34 and breakable seal 36. The release layer separates the seam 30 from the breakable seal 36. The release layer, for example, can be made of a wax, which when heated allows mechanical separation of the seal 30 from the breakable seal 36. The breakable seal 36, for example, can be a metal foil or plastic film or combination thereof.

Method of Making (Single Blow Pin Method)

The spray bottle according to the present invention can be made on a blow molding apparatus. The blow molding apparatus is set up to provide a single blow pin per mold cavity.

The mold for use in making the spray bottle according to the present invention is machined and shaped to produce a particular multiple neck design. An upper end of the mold cavity is configured for making the first neck portion, and above the cavity for the first neck portion is provided a vertically aligned through hole extending from the mold cavity to an upper surface of the mold. The through hole is configured for accommodating the single blow pin of the molding apparatus.

The blow molding apparatus is provided with a heated extruder for melting plastic pellets and forming an extruded parison. For example, the blow molding apparatus can be configured for extruding a hollow cylindrical-shaped parison downwardly around the single blow pin. The parison is extruded between the mold halves of the open mold, and is aligned so as to be located (e.g. centered) inside the mold cavity when the mold halves are closed.

When the parison is extruded to a sufficient length (e.g. slightly longer relative to height of spray bottle), the blow molding apparatus closes the mold halves onto the parison causing the parison to be sealed along its upper and lower ends. The blow pin provides air pressure inside the hollow parison as it is extruded to maintain the parison partially inflated, and then blows up the parison inside the mold cavity when the upper and lower ends of the parison are sealed by closing mold halves.

The parison is inflated so that the parison expands into the surfaces of the mold cavity. The mold is cooled by water circulated through a water cooling circuit in the mold. When the expanding surfaces of the parison come into contact with the surfaces of the mold cavity, the hot plastic melt of the parison is cooled and solidifies taking on the shape of the mold cavity.

To form the first neck portion, the upper end of the parison is molded on the inside by the shape (e.g. cylindrical) of the single blow pin, and on the outside by the shape (e.g. threaded neck design) of the first neck portion of the mold cavity. To form the second neck portion, a portion of the parison expands outwardly into a portion of the mold cavity shaped (e.g. threaded neck design) to mold the second neck portion. In this method, the second neck portion is formed as a portion of the wall of the spray bottle. Thus, the second neck portion is molded closed, and must be open in a separate operation after the spray bottle is blow molded. For example, the end wall of the second neck portion can be opening by machining (e.g. drilling, boring, reaming, stamping, etc.). Alternatively, the blow mold can be provided with a blow tube, which blows open the end of the second neck portion. In a further alternative, the second neck portion can be blow molded to have a frangible end portion to allow a user to break open the end of the second neck portion.

EXAMPLE 1

The two (2) neck spray bottle design shown in FIGS. 1–3 has been successfully molded in a high speed production. The first neck portion 24 has been mold on the inside by a cylindrical-shaped blow pin and on the outside with a helical thread design. The second neck portion 28 is made as a portion of the wall of the spray bottle, and thus has a closed configuration. After the spray bottle 10 was molded, an opening in the end wall of the second neck portion was bored with a drill/ream tool.

Figure 10:
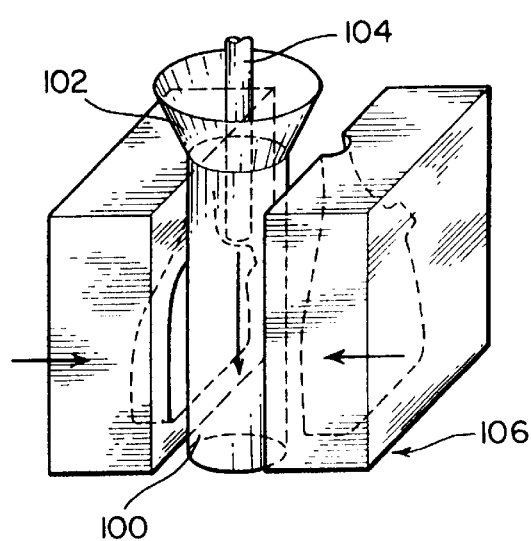
FIG. 10 is a perspective view showing a hollow cylindrical parison being vertically exuded downwardly between open halves of the blow mold in an open mode.

As shown in FIG. 10, a hollow cylindrical-shaped parison 100 is extruded from hot melt plastic (e.g. high density polyethylene). Specifically, the parison 100 is extruded in a downward vertical direction from the extrusion die 102. The parison is acted upon by gravity pulling the parison downwardly while a single blow pin 104 partially inflates the hollow space in the center of the parison 100, since the lower end of the parison is open to the atmosphere preventing inflation of the parison 100. The forces applied on the parison 100 by gravity and pressure by partial inflation tend to stabilize the highly pliable parison as it is formed. The extrusion die 102 is positioned above and relative to the blow mold 106 so that the parison 100 is extruded downwardly between the open mold halves of the blow mold 106.

Figure 11:
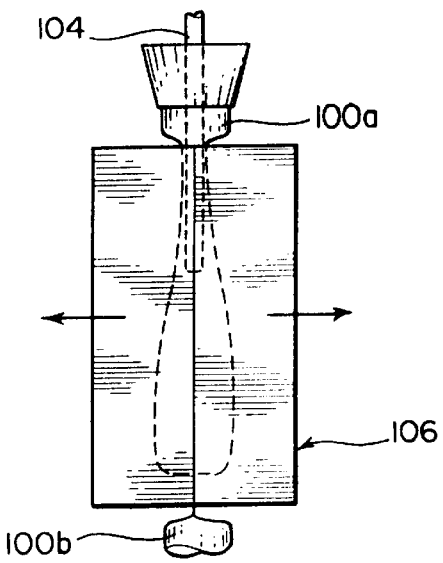
FIG. 11 is an end elevational view of the blow molding operation shown in FIG. 10, with the blow mold in a closed configuration.

As shown in FIG. 11, when the mold halves of the blow mold 106 a re closed, the upper end 100a and lower end 100b of the parison 100 were crimped off sealing the upper and lower ends of the parison 100 located inside the cavity of the blow mold 106. Air being pumped through the single blow pin 104 then began to inflate the parison inside the mold cavity of the blow mold 106 until the spray bottle is completely molded. The mold halves of the blow mold 106 were then opened to allow the spray bottle to drop from the blow mold 106.

Figure 12:
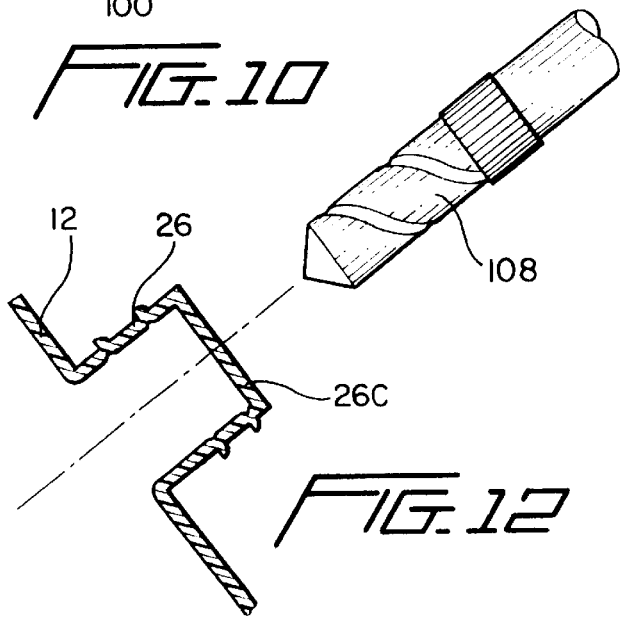
FIG. 12 is a partially broken away side cross-sectional view through a second neck portion of the spray bottle with a closed end portion ready to be opened by a drilling/reaming tool.
Figure 13:
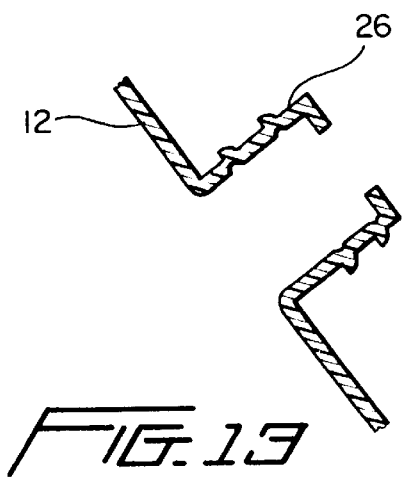
FIG. 13 is a partially broken away side cross-sectional view through a second neck portion of the spray bottle as shown in FIG. 12 after the drilling reaming operation to open an end of the second neck portion.

As shown in FIG. 12, the second neck portion 26 is molded with a closed end portion 26c, since the second neck portion 26 is molded as a portion of the wall of the spray bottle. The second neck portion 26 is finished (i.e. opened) by a drilling/reaming operation with tool. The finished second neck portion 26 is shown in FIG. 13.

Method of Making (Two-Pin Method)

The blow molding apparatus can be configured with two (2) separate blow pins to be accommodated by a single mold cavity of the blow mold. Specifically, the blow mold is provided with two (2) separate through holes (i.e. one for each neck portion being molded) for accommodating the two (2) separate blow pins.

Figures 14A, 14B, 14C:
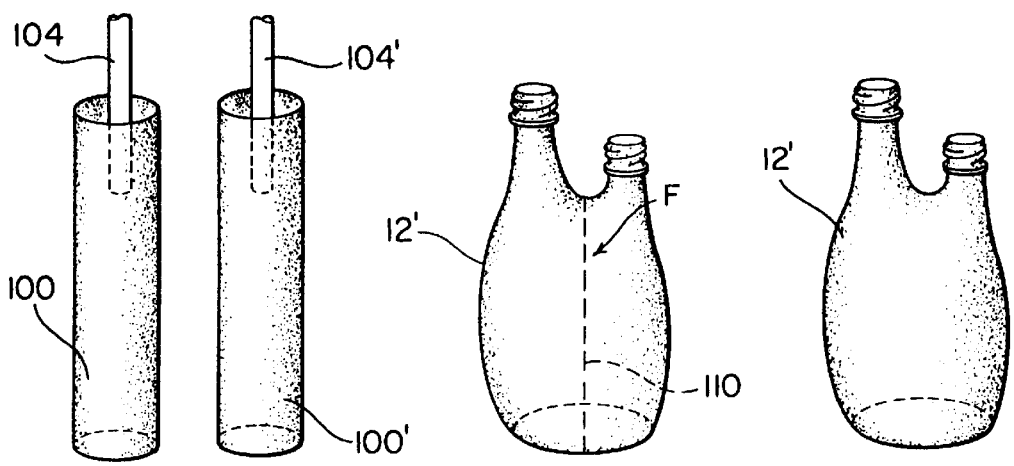
FIG. 14A is a diagrammatic perspective view of two (2) hollow cylindrical-shaped parisons being extruded downwardly in a two (2) blow pin molding operation for making a spray bottle according to the present invention.
FIG. 14B is a diagrammatic perspective view of a resulting spray bottle having an inner wall in the two (2) blow pin method shown in FIG. 14A.
FIG. 14C is a diagrammatic perspective view of a finish spray bottle resulting from the two (2) blow pin method shown in FIGS. 14A and 14B.

In one embodiment, two separate parisons are extruded about each separate blow pins 104, 104' for molding each neck portion , as shown in FIG. 14A. The blow mold is provided with two (2) through holes for accommodating the two (2) separate spaced-apart blow pins 104, 104'.

In the spray bottle 12' as shown in FIG. 14B, an inner wall 110 is formed by contact between the two (2) separate parisons when expanded. In one embodiment, a force F is applied, for example with a tool (e.g. mechanical, electrical, hydraulic, pneumatic), air jet, or other means located externally or internally relative to the blow mold, to compromise the inner wall 100 to provide a single compartment spray bottle. Alternatively, the inner wall 110 is maintained to provide two (2) separate chambers that are completely sealed from each other. In another embodiment, the inner wall 110 is partially maintained to provide two (2) separate chambers that are not completely sealed (e.g. fluid passageway between chambers at top portion of wall 110).

Figures 15A, 15B, 15C:
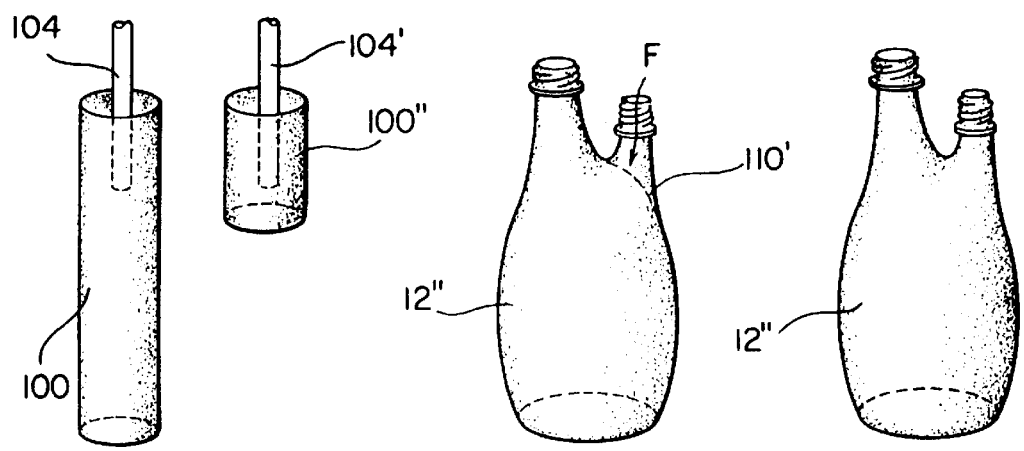
FIG. 15A is a diagrammatic perspective view of two (2) different length hollow cylindrical-shaped parisons being extruded downwardly in a two (2) blow pin molding operation for making a spray bottle according to the present invention.
FIG. 15B is a diagrammatic perspective view of a resulting spray bottle having an inner wall in the two (2) blow pin method shown in FIG. 15A.
FIG. 15C is a diagrammatic perspective view of a finish spray bottle resulting from the two (2) blow pin method shown in FIGS. 15A and 15B.

In an alternative two (2) blow pin method, a first normal length parison 100 and a second short length parison 100' are extruded, as shown in FIG. 15A. The parison 104 is inflated while the parison 104' is only slightly inflated (i.e. differential inflation) or maintained inflated without expansion causing the formation of the inner wall 110' adjacent the second neck portion. A force F provided by, for example a mechanical tool, air jet, or other means, can be used to compromise the inner wall 110' to provide a single chamber spray bottle 12".

Figures 16A, 16B, 16C:
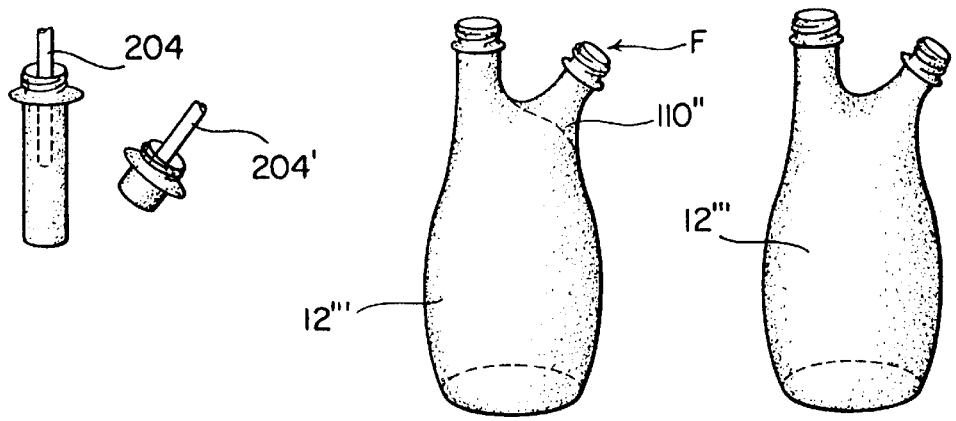
FIG. 16A is a diagrammatic perspective view of two (2) injection molded parisons being extruded downwardly in a two (2) blow pin molding operation for making a spray bottle according to the present invention.
FIG. 16B is a diagrammatic perspective view of a resulting spray bottle having an inner wall in the two (2) blow pin method shown in FIG. 16A.
FIG. 16C is a diagrammatic perspective view of a finish spray bottle resulting from the two (2) blow pin method shown in FIGS. 16A and 16B.

In a further alternative two (2) blow pin method, a first parison 204 and a second parison 204' are provided, as shown in FIG. 16A The parisons 204 and 204' are made by a prior injection molding step, and then loaded into the blow mold prior to the blow molding operation. The parison 204 is inflated while the parison 204' is only slightly inflated (i.e. differential inflation) or maintained inflated without expansion causing the formation of the inner wall 110' adjacent the second neck portion. A force F provided by, for example a mechanical tool, air jet, or other means, can be used to compromise the inner wall 110' to provide a single chamber spray bottle 12".

In an alternative single blow pin method related to the method shown in FIGS. 16A, 16B and 16C, only the parison 204 is used in a blow mold having a single through hole, and the second neck portion is blown as a portion of the wall and then subsequently opened by a separate finishing step. Thus, this method is similar to the method shown in FIGS. 10 and 11, however, with the hot extruded parison 100 replaced with the injection molded parison 204.

We claim:

1. A method of manufacturing a multiple neck spray bottle for use with a spray head, said method comprising the steps of:

providing a mold having a molding cavity configured for blow molding a multiple neck spray bottle having multiple externally threaded neck portions with at least one threaded neck portion configured to connect with the spray head;

providing at least one plastic parison inside the molding cavity, the neck portions of the multiple neck spray bottle being molded are located substantially within a width of the parison;

blow molding the parison provided inside the molding cavity with a single blow pin to form the multiple neck spray bottle with at least one neck portion of the spray bottle being formed in a wall portion of the spray bottle;

opening the blow mold to release the formed multiple neck spray bottle from the blow mold; and opening the at least one neck portion formed in the wall portion of the spray bottle.

2. A method according to claim 1, wherein said at least one parison is extruded from hot plastic melt.

3. A method according to claim 2, wherein said at least one parison is extruded in a hollow cylindrical shape about said at least one blow pin, and wherein said parison is extruded between mold halves of the blow mold in an open mode.

4. A method according to claim 1, wherein said step of opening is provided by one selected from the group consisting of a tool located external to the blow mold, a tool located internal to the blow mold, air jet located external to the blow mold and air jet located internal to the blow mold.

5. A method according to claim 1, wherein separate neck portions of said multiple neck spray bottle are provided at different heights of the spray bottle.

6. A method according to claim 1, wherein a first neck portion of the multiple neck spray bottle is formed vertically, and a second neck portion is formed at an angle relative to a vertical axis of the spray bottle.

7. A method according to claim 6, wherein a wall of said second neck portion is formed so as to be reinforced against deformation compared with other wall portions of the spray bottle.

8. A method according to claim 1, wherein said blow mold is provided with a single through hole for accommodating said single blow pin.

9. A method according to claim 1, wherein said at least one parison is injection molded prior to the step of blow molding.

10. A method according to claim 9, wherein said step of opening is provided by one selected from the group consisting of a tool located external to the blow mold, a tool located internal to the blow mold, air jet located external to the blow mold and air jet located internal to the blow mold.

11. A method according to claim 1, wherein said plastic parison is made of plastic of one selected from the group consisting of polyethylene, polypropylene, polyvinyl chloride (PVC), and polyethylene terephalate (PET).

* * * * *